United States Patent
Knoll et al.

(10) Patent No.: US 11,877,549 B2
(45) Date of Patent: Jan. 23, 2024

(54) CONTROLLER FOR SEAWEED FARM

(71) Applicant: X Development LLC, Mountain View, CA (US)

(72) Inventors: Matthew Aaron Knoll, Mountain View, CA (US); Charles Nordstrom, Berkeley, CA (US); Neil Davé, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 233 days.

(21) Appl. No.: 17/532,090

(22) Filed: Nov. 22, 2021

(65) Prior Publication Data

US 2023/0157230 A1    May 25, 2023

(51) Int. Cl.
| | | |
|---|---|---|
| A01G 33/00 | (2006.01) | |
| G05B 15/02 | (2006.01) | |
| A01D 44/00 | (2006.01) | |
| A01C 1/04 | (2006.01) | |

(52) U.S. Cl.
CPC .............. *A01G 33/00* (2013.01); *A01C 1/044* (2013.01); *A01D 44/00* (2013.01); *G05B 15/02* (2013.01)

(58) Field of Classification Search
CPC ......... A01G 33/00; A01C 1/044; A01D 44/00
See application file for complete search history.

(56) References Cited

U.S. PATENT DOCUMENTS

| | | |
|---|---|---|
| 10,856,520 B1 | 12/2020 | Kozachenok et al. |
| 2016/0219811 A1* | 8/2016 | Kati ....................... A01G 33/00 |
| 2017/0150701 A1 | 6/2017 | Gilmore et al. |
| 2019/0228218 A1 | 7/2019 | Barnaby et al. |
| 2019/0340440 A1 | 11/2019 | Atwater et al. |

(Continued)

FOREIGN PATENT DOCUMENTS

| | | |
|---|---|---|
| CL | 2019000039 A1 | 3/2019 |
| CN | 108040948 | 5/2018 |

(Continued)

OTHER PUBLICATIONS

Extended Search Report in European Appln. No. 22151132.2, dated May 2, 2022, 10 pages.
International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.

(Continued)

*Primary Examiner* — Richard G Davis
(74) *Attorney, Agent, or Firm* — Fish & Richardson P.C.

(57) ABSTRACT

Methods and systems, including computer programs encoded on computer-storage media, for controlling a system for growing seaweed are described. Some implementations of a method include forming a substrate loop inoculated with seaweed spores; arranging the substrate loop about a pulley; submerging the substrate loop to grow the seaweed; determining, using a seaweed farm controller, that the seaweed has grown to a pre-determined size; and based on the determination that the seaweed has grown to a pre-determined size: providing instructions to the pulley to feed a section of the substrate loop to a harvesting unit; providing instructions to the harvesting unit to separate the seaweed attached to the section of the substrate loop; providing instructions to a cleaning unit to clean the section of the substrate loop that is freed from seaweed; and providing instructions to a seeding unit to inoculate the cleaned section of substrate loop with seaweed spores.

20 Claims, 6 Drawing Sheets

(56) References Cited

U.S. PATENT DOCUMENTS

| | | | |
|---|---|---|---|
| 2020/0107524 A1 | 4/2020 | Messana et al. | |
| 2020/0155882 A1 | 5/2020 | Tohidi et al. | |
| 2020/0288678 A1 | 9/2020 | Howe et al. | |

FOREIGN PATENT DOCUMENTS

| | | |
|---|---|---|
| EP | 2244934 | 11/2010 |
| EP | 3484283 | 5/2019 |
| JP | 2002171853 | 6/2002 |
| KR | 102115591 | 5/2020 |
| KR | 20200137426 | 12/2020 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO 2015/036842 | 3/2015 |
| WO | WO 2017/131510 | 8/2017 |
| WO | WO2017137896 | 8/2017 |
| WO | WO 2017/222373 | 12/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon *Salmo salar*," Journal of Fish Biology, Nov. 2017, 91(6):1699-1712.
Flavin et al., "Kelp Farming Manual: A Guide to the Processes, Techniques, and Equipment for Farming Kelp in New England Waters," Ocean Approved Farming the North Atlantic, 2013, 130 pages.
Forbord et al., "Effect of seeding methods and hatchery periods on sea cultivation of *Saccharina lastissma* (Pphaeophyceae): a Norwegian case study," Journal of Applied Phycology, 2020, 32:2201-2212.

\* cited by examiner

CONTROLLER FOR SEAWEED FARM

FIELD

This specification relates to a controller for systems for growing seaweed.

BACKGROUND

Seaweed refers to several types of plants and algae that grow in marine environments. Seaweed features in different cuisines and is also used in cosmetics, animal feed, and fertilizer. Examples of seaweed include dulse, bull kelp, ribbon kelp, and sugar kelp. Although seaweed grows naturally in the ocean, it can also be grown in underwater farms. Seaweed farms have been used to improve water quality, sequester carbon, and combat the effects of ocean acidification. Seaweed is grown on underwater nets or ropes that are hauled to the surface for harvesting and can be labor intensive in many cases.

SUMMARY

In general, innovative aspects of the subject matter described in this specification relate to controlling a system for growing seaweed.

A system that provides automated control of a seaweed growing system may reduce the manual labor necessary to grow seaweed. For example, after a first growth cycle is initiated, subsequent harvesting and growth cycles can be operated remotely and largely automatically. Presently, there is more to be learned about optimum parameters for growing seaweed. An automated system such as the one described in the present disclosure can be used to collect information on growing parameters to ultimately improve the yield of seaweed farms.

One innovative aspect of the subject matter described in this specification is embodied in a method that includes forming a substrate loop inoculated with seaweed spores; arranging the substrate loop about a pulley; submerging the substrate loop to grow the seaweed; determining, using a seaweed farm controller, that the seaweed has grown to a pre-determined size; and based on the determination that the seaweed has grown to a pre-determined size: providing, using the seaweed farm controller, instructions to the pulley to feed a section of the substrate loop to a harvesting unit; providing, using the seaweed farm controller, instructions to the harvesting unit to separate the seaweed attached to the section of the substrate loop; providing, using the seaweed farm controller, instructions to a cleaning unit to clean the section of the substrate loop that is freed from seaweed; and providing, using the seaweed farm controller, instructions to a seeding unit to inoculate the cleaned section of substrate loop with seaweed spores.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination.

Forming the substrate loop may include exposing a length of seed twine to a solution containing seaweed spores, and incubating the spores under artificial light in temperature-controlled containers with circulating aerated seawater. Forming the substrate loop may include intertwining the seed twine with a length of rope having a diameter larger than a diameter of the seed twine. Forming the substrate loop may include preparing a solution comprising seaweed spores and a binding agent, and applying the solution to the substrate loop. Forming the substrate loop may include sealing a portion of the substrate loop with water soluble film. Forming the substrate loop may include applying a fertilizer to the substrate loop.

Submerging the substrate loop may include varying the depth of the substrate loop over time.

Forming the substrate loop may include attaching a waterproof pod containing a sensor, wherein the seaweed farm controller is configured determine that the seaweed has grown to a pre-determined size based on data from the sensor.

Some instances may include monitoring, using a camera, the underwater growth of the seaweed, wherein the seaweed farm controller is configured determine that the seaweed has grown to a pre-determined size based on image data obtained from the camera. Some instances may include monitoring the weight of the seaweed attached to the substrate loop, wherein the seaweed farm controller is configured determine that the seaweed has grown to a pre-determined size based on said weight.

The harvesting unit may be configured to untwist the section of the substrate loop.

The seaweed may be sea kelp, and the seaweed spores comprise one or more of meiospores, gametophytes, and juvenile sporophytes.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
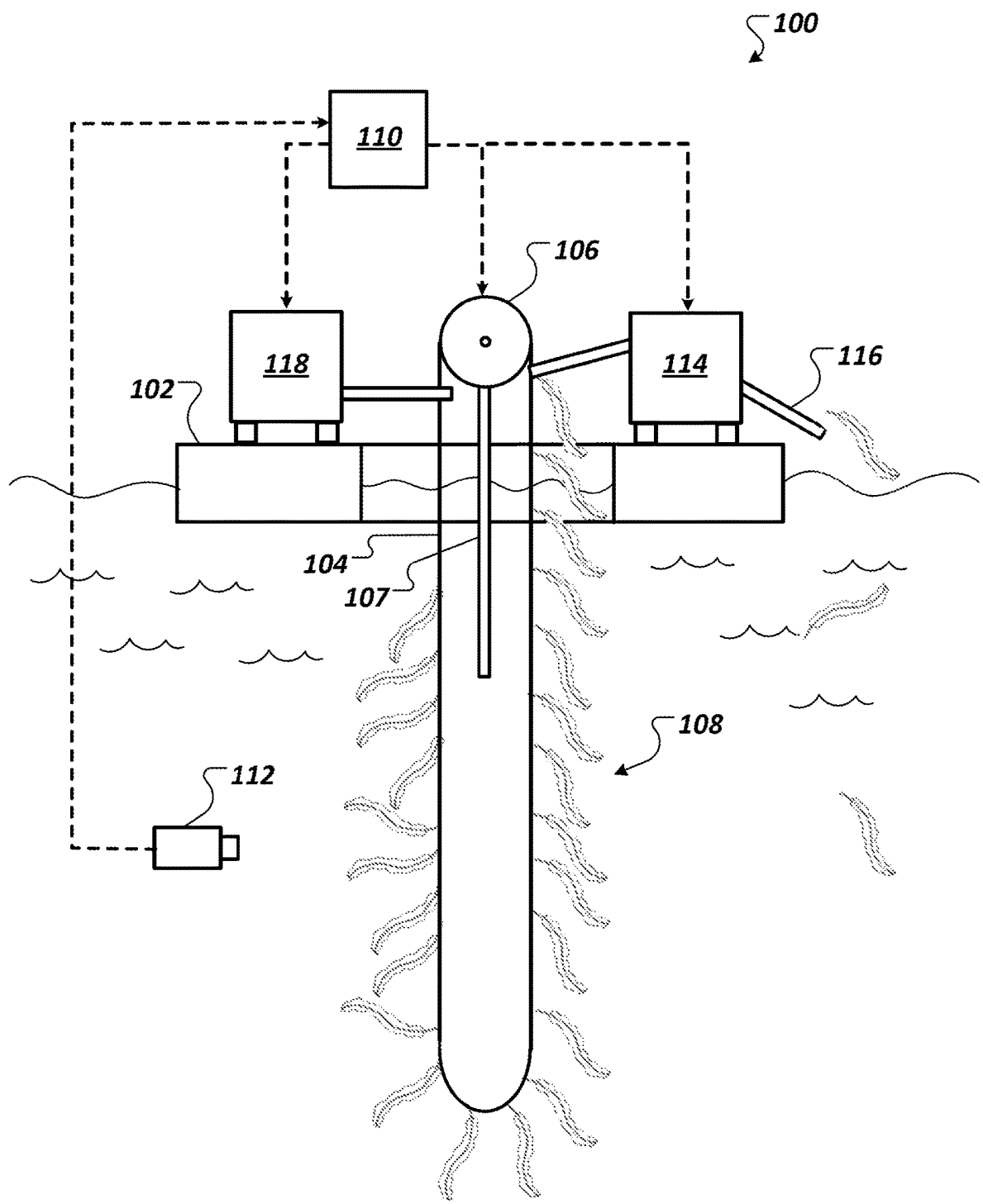
FIG. 1 depicts an example seaweed farm for growing seaweed.

FIG. 1 depicts an example seaweed farm 100 for growing seaweed. The system 100 is arranged on a platform or barge 102 floating on a body of water. In the illustrated example, the seaweed is sea kelp that is grown in the open ocean. However, the systems and techniques of the present disclosure can be applied to other types of seaweed and environments as well.

The system 100 includes a substrate loop 104 that is suspended vertically from a pulley 106 that is mounted to the barge 102. A substantial portion of the loop 104 is submerged in the ocean and serves as a growing medium for the kelp plants 108. The substrate loop 104 is inoculated with seaweed spores before being submerged in water. In the case of sea kelp, the seaweed spores can include one or more of meiospores, gametophytes, and juvenile sporophytes.

The system 100 and growth process are controlled by a seaweed farm controller 110. For example, the pulley 106 may be mounted to a vertically extending frame 107. The controller 110 may provide instructions for the pulley 106 to move along the frame 107 to change the depth at which the substrate loop 104 is submerged. In some implementations, the controller 110 is configured to monitor the growth of the kelp plants 108. For example, the controller 110 may be connected to a camera 112 that captures images of the substrate loop 104 and kelp plants 108. The controller 110 may upload the images captured by the camera 112 to a server (not shown) for subsequent viewing by a human operator who determines whether the kelp plants 108 are ready to be harvested. In some instances, the controller 110 may apply image processing and algorithms to determine the extent of growth.

The system 100 further includes a harvesting unit 114 that separates the mature kelp plants 108 from the substrate loop 104. In the depicted example, the harvesting unit 114 includes a chute 116 that disposes the harvested kelp plants 108 into the ocean for carbon sequestration. In other examples, the harvested kelp plants 108 may be collected in a hopper or other container for further processing as food, fertilizer, or a cosmetic ingredient. The illustrated harvesting unit 114 can include a cleaning unit to clean the substrate loop 104 as the kelp plants 108 are separated from the substrate loop 104.

The system 100 also includes a seeding unit 118 that inoculates the freshly cleaned sections of the substrate loop 104 with seaweed spores. In this way, the substrate loop 104 can be automatically regenerated for a further growth cycle. In the illustrated examples of FIG. 1 and FIG. 6, the harvesting unit 114 and the seeding unit 118 are arranged above the waterline on the floating barge 102. However, in other examples, the harvesting unit 114, the seeding unit 118, or both may be submerged below the waterline.

Figure 2:
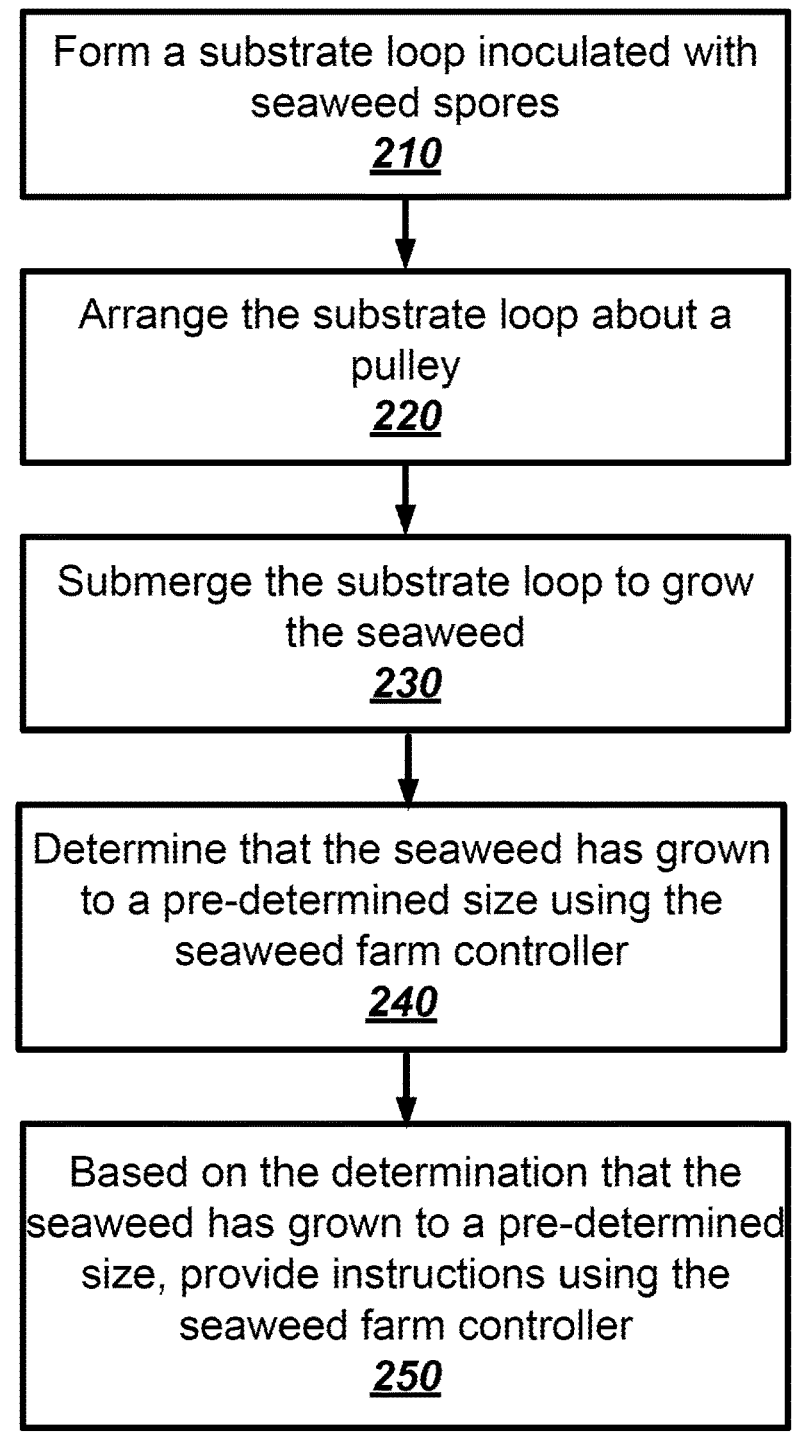
FIG. 2 is a flow diagram for an example process of growing seaweed according to the present disclosure.

FIG. 2 is a flow diagram for an example process 200 for growing seaweed. The example process 200 may be performed by various systems, including the seaweed farm 100 of FIG. 1. As described above, the seaweed can be sea kelp. Sea kelp can be grown from seaweed spores that may include one or more of meiospores, gametophytes, and juvenile sporophytes.

The process 200 includes forming a substrate loop inoculated with seaweed spores (210). In other words, the process 200 may initially start with a length of substrate, e.g., rope or a strip of fabric that is formed into a substrate loop. The substrate can be made of fibers, e.g., natural fibers, such as wool, cotton, sisal, jute hemp, henequen, and coconut fibers. The fibers can be twisted or braided to make rope or twine, or woven into a fabric. Once arranged in the loop, the same substrate may be used for multiple growth and harvesting cycles in some instances. Following the final growth cycle, the substrate loop may be spliced open and allowed to sink to the ocean floor for the purpose of carbon sequestration.

In some implementations, the initial length of substrate may be obtained "pre-seeded" with seaweed seedlings that have been cultivated to an initial size under laboratory conditions. In such cases, forming the substrate loop may include exposing a length of seed twine to a solution containing seaweed spores and incubating the spores under artificial light in temperature-controlled containers with circulating aerated seawater. These conditions may be maintained for 4 to 6 weeks, during which the spores grow and become attached to the seed twine.

The seed twine can be made of nylon and have a diameter of 5-10 mm in some cases. The seed twine can be wrapped around sections of PVC pipes for the incubation process and transport to the seaweed farm. In some instances, the seed twine may be intertwined with a length of growth rope having a diameter larger (e.g., 15-30 mm) than the diameter of the seed twine. The composite substrate may withstand the weight of the growing seaweed and damage caused by aquatic animals or the movement of waves to name a few examples.

In some implementations, the initial length of substrate may be inoculated via "direct seeding" at the seaweed farm. In such cases, forming the substrate loop may include preparing a solution comprising seaweed spores and a binding agent and applying the solution to the substrate loop. For example, the binding agent may be used to thicken the solution and prevent the suspended spores from being washed away before they can attach to the substrate loop. The solution can be applied to the substrate loop as a spray, a stream, or using pods, as described below in more detail (see also FIGS. 3A and 3B). The solution can be applied to an initial length of substrate whose ends are subsequently joined to form the substrate loop. Alternatively, the substrate can be arranged in a loop before the solution is applied.

In some instances, forming the substrate loop further includes applying a fertilizer to the substrate loop. For example, the fertilizer can include inorganic carbon, nitrogen, and/or phosphorous. The fertilizer may be applied to the substrate loop prior to the substrate loop being submerged in water. In other instances, fertilizer is applied to the substrate via exposure to nutrients in the water of the seaweed farm. For example, agricultural run-off may be used to increase the content of nitrogen and/or phosphorus in the waters of the seaweed farm.

Figure 3B:
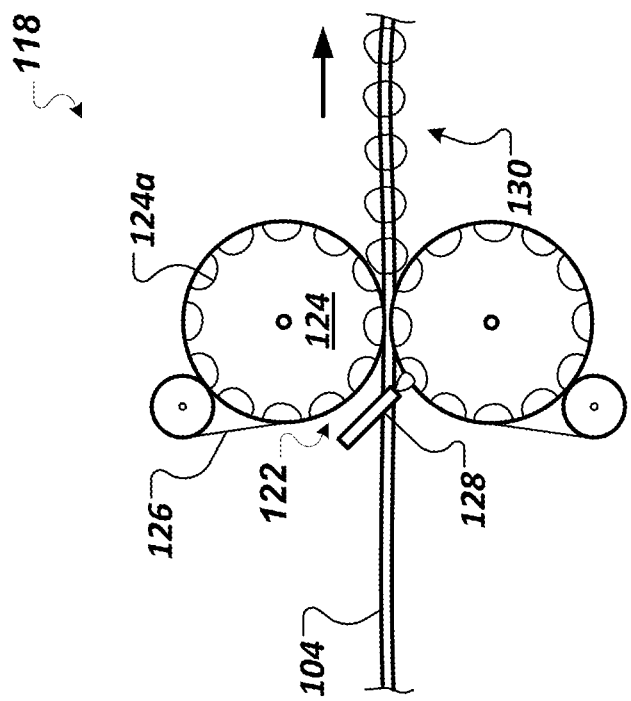
FIGS. 3A and 3B depict examples of a seeding unit.

In some instances, forming the substrate loop further includes sealing a portion of the substrate loop with cold water soluble film. For example, such a film may be made from polyvinyl alcohol (PVA). In some applications, some or all of the length of the substrate loop can be encased in a polyvinyl alcohol film after being exposed to a solution containing seaweed spores. The film may prevent the spore solution from initially being washed away when the substrate loop is submerged in the water, thus improving the adhesion of seaweed spores to the substrate. Rather than encasing a substantial portion of the substrate loop, some implementations may use water soluble film to form "pods" that encase a viscous liquid solution or gel and a portion of the substrate loop (FIG. 3B). The viscous solution can include seaweed spores and binding agent in some cases. In some cases, the water soluble pods can include a fertilizing solution that is released over time.

In implementations of the process 200, the opposing ends of the initial elongate substrate can be joined to form the substrate loop in different ways. For example, the initial elongate substrate may include a rope of braided or twisted fibers. The ends of the rope can be tied to form a knot or spliced to form a nearly seamless loop. The ends of the rope may be provided with corresponding hardware that engages to form the substrate loop. In some instances, the initial elongate substrate may take the form of a belt or strip of woven material. The ends can be joined by sewing or bonding to name a few examples. Instead of joining the ends of an elongate substrate, some implementations of the process 200 may use a seamless substrate loop. As described below in more detail in reference to FIG. 5, the opposing ends of the elongate substrate can be joined to form the substrate loop as part of the deployment process in some cases.

The process 200 includes arranging the substrate loop about a pulley (220). In some instances, the pulley is designed to support the substrate loop in a submerged configuration and guide the substrate loop as it moves. The pulley may be a driven pulley that is attached to a motor.

The process 200 includes submerging the substrate loop to grow the seaweed (230). In some instances, the substrate loop is submerged in a substantially vertical orientation. In other instances, the substrate loop is submerged in a substantially horizontal orientation. In this regard, "vertical" refers to a direction substantially perpendicular to the water's surface, while "horizontal" refers to a direction substantially parallel to the water's surface. In each configuration, the substrate loop may be supported by an additional frame.

One or more floaters or weights can be attached to the substrate loop to maintain the loop in the desired position. For example, buoyant floaters may be attached to the substrate loop at regular intervals. When the seaweed attached to the substrate is immature, i.e., relatively small, the floaters' buoyant forces may support the substrate loop relatively close to the water's surface. As the seaweed grows, its combined weight may overcome the floaters' buoyancy, and the substrate loop may sink to a depth that is more suitable for a later stage in the seaweed's growth cycle.

Once deployed, the substrate loops may remain submerged in the water as the seaweed grows. For example, the period of growth for some types of sea kelp may range from 3 to 4 months (e.g., 120 days). In some instances, submerging the substrate loop includes varying the depth of the substrate loop over time. For example, at the start of the growing process, the substrate loop may be suspended close to the water's surface where it is exposed to more sunlight. As time goes on, the substrate loop may be moved to greater depths where the water conditions (e.g., water temperature and nutrient density) may be different. The seaweed farm controller may be configured to adjust the submersion depth based on a protocol specific to the type of seaweed.

The process 200 includes determining, using an seaweed farm controller (e.g., the controller 110 in FIG. 1), that the seaweed has grown to a pre-determined size (240). At this point, the seaweed is typically ready for harvesting. The system controller can determine that the seaweed has grown to a pre-determined size in several ways.

In some instances, the system controller determines that the seaweed has grown to a pre-determined size by comparing an average growth rate to the time elapsed since the substrate loop was submerged in water.

In some instances, forming the substrate loop includes attaching a waterproof pod to the substrate loop that houses a sensor. Information obtained from the sensor during the growth cycle can be used to determine that the seaweed has grown to a pre-determined size. In some cases, the sensor may also be used to monitor water conditions, e.g., a temperature sensor.

In some instances, the process 200 includes monitoring, using a camera, the underwater growth of the seaweed. For example, the camera may be attached to the substrate loop in a waterproof pod. In some implementations, the camera may be a stand-alone camera directed towards the submerged substrate loop (FIG. 1). The seaweed farm controller may be configured determine that the seaweed has grown to a pre-determined size based on image data obtained from the camera. For example, the camera may upload images of the seaweed to a server for viewing by a user. The user may trigger a command wirelessly sent to the seaweed farm controller to begin the harvesting process. In other instances, the images obtained from the camera may be processed using image processing techniques and algorithms to determine the growth of the seaweed, i.e., whether the seaweed is ready for harvesting.

In some instances, the pulley or a support frame for the substrate loop may include a scale that determines the weight of the seaweed attached to the substrate loop. The seaweed farm controller can receive and compare the weight data to a threshold value to determine that the seaweed is ready for harvesting.

Figure 4:
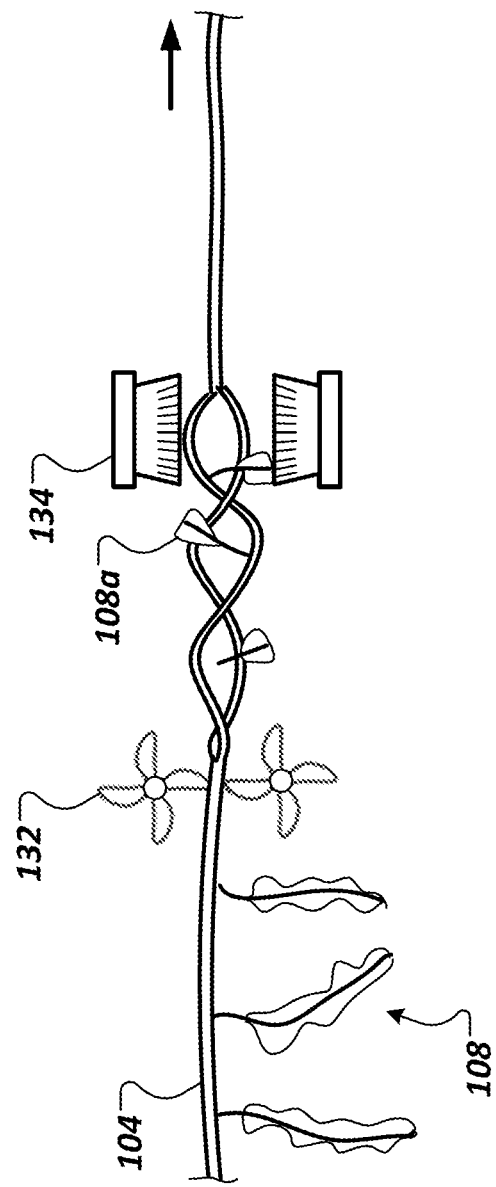
FIG. 4 depicts an example of a harvesting and cleaning unit.

The process 200 includes, based on the determination that the seaweed has grown to a pre-determined size, providing a series of instructions using the seaweed farm controller. The instructions include instructions to the pulley to feed a section of the substrate loop to a harvesting unit (250a). For example, the seaweed farm controller may send a signal to a motor attached to the pulley to rotate the pulley and feed the substrate loop towards a harvesting unit. In some instances, feeding the substrate loop may include raising a section of the submerged loop above the waterline. In other cases, the substrate loop may remain submerged as it is fed to the harvesting unit. The instructions include instructions to the harvesting unit to separate the seaweed attached to the section of the substrate loop (250b). For instance, the harvesting unit may be configured to untwist the section of the substrate loop to release the seaweed (FIG. 4). The instructions include instructions to a cleaning unit to clean the section of the substrate loop that is freed from seaweed (250c). The cleaning unit may use brushes or a high-pressure spray to clean the section of the substrate loop that is freed from seaweed. The instructions include instructions to a seeding unit to inoculate the cleaned section of substrate loop with seaweed spores (250d). The seeding unit may be used for the inoculation of both the initial elongate substrate prior to submersion and the inoculation after harvesting. As described, a single substrate loop can be used for multiple growth and harvesting cycles that are run with minimal human intervention.

Figure 3A:
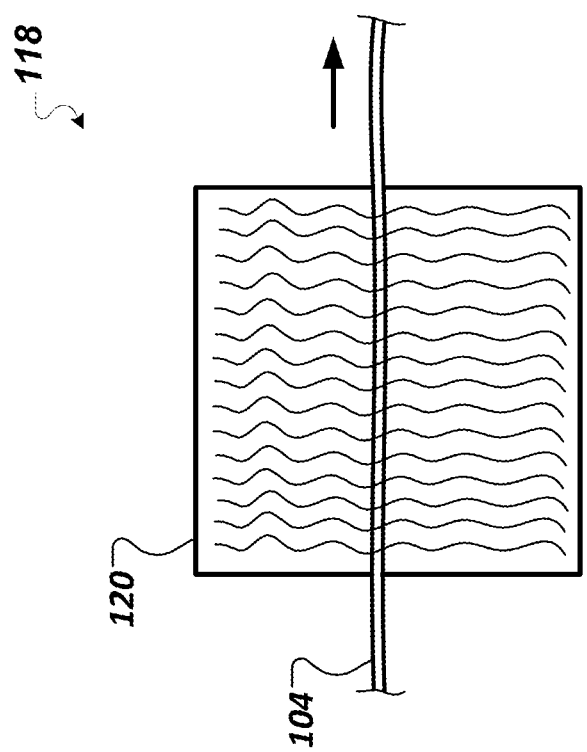

Referring now to FIGS. 3A and 3B, examples of a seeding unit 118 are explained in more detail. The depicted seeding units 118 are shown inoculating the substrate loop 104 with seaweed spores but can also be used to inoculate the initial length of elongate substrate that is used to form the substrate loop 104. In some cases, the initial length of elongate substrate may be obtained in a "pre-seeded" condition described above, and the seeding steps for subsequent growth cycles are implemented using either of the seeding units 118 shown.

FIG. 3A depicts one example of a "direct seeding" operation in which a solution that includes seaweed spores and a binding agent is applied to the substrate loop 104. In addition to the seaweed spores and binding agent, the solution may include seawater in some instances. In this implementation, the seeding unit 118 includes a trough 120. The solution flows along a surface of the trough 120 (from top to bottom in FIG. 3A), while the substrate loop 104 moves perpendicularly to the flow of solution (from left to right in FIG. 3A). The trough 120 can include a pump for recirculating the solution to provide a continuous stream to coat the entire length of the substrate loop 104. In this example, the material of the substrate loop 104 is selected so that the fibers absorb the solution like a sponge. The seeding unit 118 may also include a wringer (not shown) to squeeze excess solution from the substrate loop 104. In some cases, the seeding unit 118 may be configured to encase the saturated substrate loop 104 in a water-soluble sleeve (not shown). The water-soluble sleeve may prevent the substrate loop 104 from drying out and improve the viability of the seaweed spores. Additionally, the water-soluble sleeve may allow the spores to attach to the substrate loop 104 without being washed away.

FIG. 3B depicts a further example of a direct seeding operation. Rather than the continuous stream of solution depicted in FIG. 3A, the seaweed spores and binding agent are provided as a preparation having greater viscosity in FIG. 3B, for example, a preparation having a gel-like texture. The substrate loop 104 enters a nip 122 formed between a pair of mold rolls 124. The surface of each mold roll 124 is provided with a plurality of indentations 124a that correspond to half of a finished "pod." A water-soluble film 126 (e.g., PVA) is placed across the surface of each mold roll 124. A nozzle 128 is disposed in the vicinity of the nip 122 and is configured to inject a viscous solution of spores and binding agent into one of the indentations 124 on the surface of the mold roll 124. As the mold rolls 124 rotate, the heat and pressure of the nip mold the water-soluble film 126 into a pod 130 attached to the substrate loop 104. The pods 130 allow the solution and spores to adhere to the substrate loop 104 without being washed away when the substrate loop 104 is submerged in water. Although FIG. 3B depicts pods filled with a solution of seaweed spores and binding agent, the same technique can be used to apply fertilizer to the substrate loop 104. Further, a modified version of the depicted technique can also be used to attach waterproof pods to the substrate loop 104. Such waterproof pods can be used to hold a variety of equipment, such as sensors or cameras.

FIG. 4 depicts an example of a harvesting unit 114. The harvesting unit 114 includes a pair of rotating blades 132 that cut mature kelp plants 108 that are attached to the substrate loop 104. In some cases, cutting the kelp plants 108 may leave stumps 108a that remain attached to the substrate loop 104. In the illustrated example, the harvesting unit 114 may be configured to "untwist" the substrate loop 104 into its constituent fibers 104a. The magnitude of untwisting is greatly exaggerated in the drawing. In some cases, untwisting may cause the stumps 108a to detach from the substrate loop 104 on their own. Alternatively, the harvesting unit 114 may include an integrated cleaning unit with a pair of brushes 134 that clean the surface of the substrate loop 104 and remove any remaining stumps 108a. Instead of brushes 134, the cleaning unit may use jets of pressurized water to clean the substrate loop 104. After being cleaned, the substrate loop 104 may proceed to the seeding unit 118 to be re-inoculated with seaweed spores for a further growth cycle.

Figure 5:
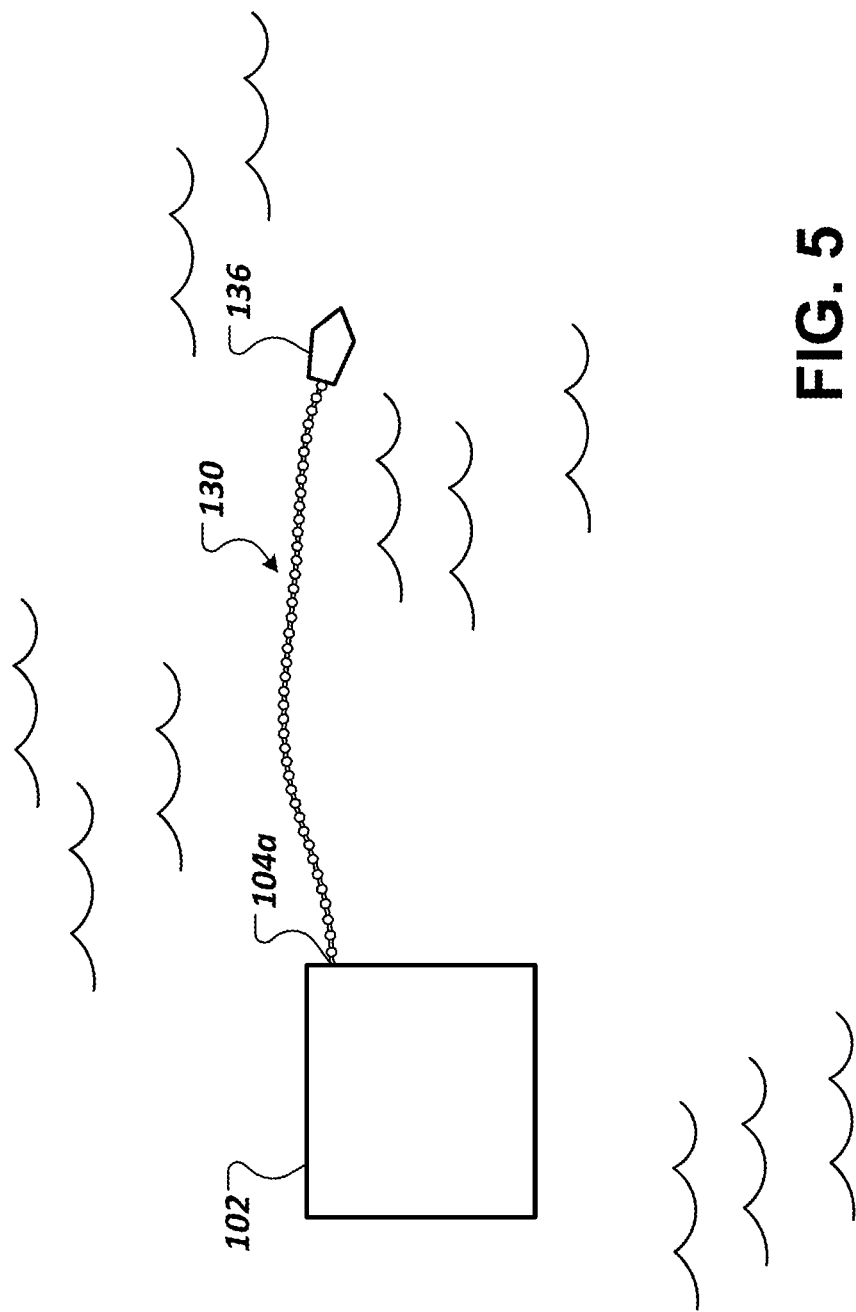
FIG. 5 depicts an example process for forming a substrate loop.

FIG. 5 depicts an example process for forming a substrate loop. An initial elongate substrate is provided with pods 130, e.g., using the seeding unit 118 depicted in FIG. 3B. It is noted that the size of the pods 130 in FIG. 5 is greatly exaggerated. The elongate substrate may be rolled onto a spool and placed on a boat 136. One end 104a of the elongate substrate may remain on the barge 102, while the boat 136 moves away from the barge 102, spooling out the substrate as it goes. After spooling out half of the substrate loop 104, the boat 136 may return to the barge 102 to close the substrate loop 104.

Figure 6:
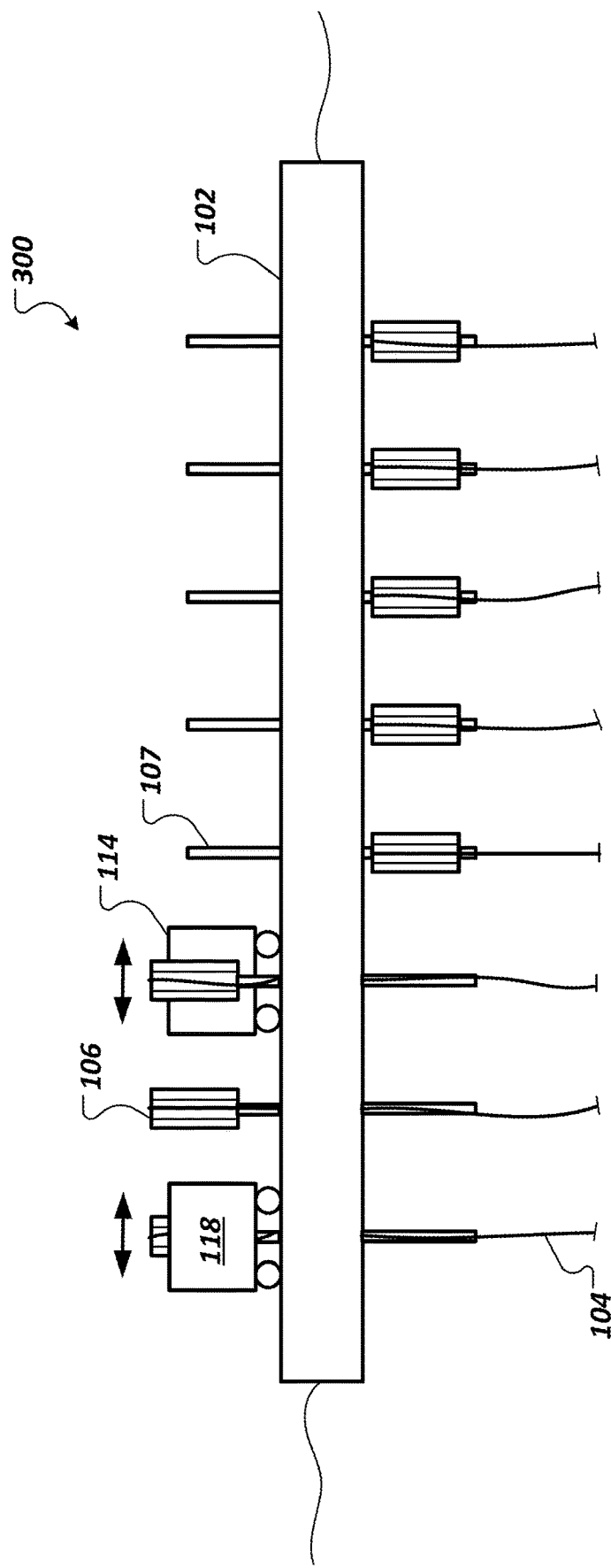
FIG. 6 depicts a further example of a seaweed farm for growing seaweed.

FIG. 6 depicts an example system 300 much like the system 100 of FIG. 1. However, the system 300 includes multiple substrate loops 104 that are each used to grow seaweed (not shown in FIG. 6). In FIG. 6, the left three substrate loops 104 are raised to the height of the barge 102, while the remaining five loops 104 remain submerged below the water's surface. The seeding unit 118 and the harvesting unit 114 may be configured to travel across the surface of the barge 102 from one substrate loop 104 to another. More specifically, the seeding unit 118 may inoculate one substrate loop 104 with seaweed spores, while the harvesting unit 114 works to remove mature seaweed from a further substrate loop 104. Depending on the specific growth conditions, such parallel processing may be more efficient than having the harvesting unit 114 and the seeding unit 118 process the same substrate loop 104 at the same time (FIG. 1).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method of growing seaweed, the method comprising:
   forming a substrate loop inoculated with seaweed spores;
   arranging the substrate loop about a pulley;
   submerging the substrate loop to grow the seaweed;
   determining, using a seaweed farm controller, that the seaweed has grown to a pre-determined size; and
   based on the determination that the seaweed has grown to a pre-determined size:
      providing, using the seaweed farm controller, instructions to the pulley to feed a section of the substrate loop to a harvesting unit;
      providing, using the seaweed farm controller, instructions to the harvesting unit to separate the seaweed attached to the section of the substrate loop;
      providing, using the seaweed farm controller, instructions to a cleaning unit to clean the section of the substrate loop that is freed from seaweed; and
      providing, using the seaweed farm controller, instructions to a seeding unit to inoculate the cleaned section of substrate loop with seaweed spores.

2. The method of claim 1, wherein forming the substrate loop comprises: exposing a length of seed twine to a solution containing seaweed spores; and incubating the spores under artificial light in temperature-controlled containers with circulating aerated seawater.

3. The method of claim 2, wherein forming the substrate loop further comprises intertwining the seed twine with a length of rope having a diameter larger than a diameter of the seed twine.

4. The method of claim 1, wherein forming the substrate loop comprises:
preparing a solution comprising seaweed spores and a binding agent; and
applying the solution to the substrate loop.

5. The method of claim 4, wherein forming the substrate loop further comprises sealing a portion of the substrate loop with water soluble film.

6. The method of claim 4, wherein forming the substrate loop further comprises applying a fertilizer to the substrate loop.

7. The method of claim 1, wherein submerging the substrate loop comprises varying the depth of the substrate loop over time.

8. The method of claim 1, wherein forming the substrate loop further comprises attaching a waterproof pod containing a sensor; and wherein the seaweed farm controller is configured determine that the seaweed has grown to a pre-determined size based on data from the sensor.

9. The method of claim 1, further comprising monitoring, using a camera, the underwater growth of the seaweed, wherein the seaweed farm controller is configured determine that the seaweed has grown to a pre-determined size based on image data obtained from the camera.

10. The method of claim 1, further comprising monitoring the weight of the seaweed attached to the substrate loop, wherein the seaweed farm controller is configured determine that the seaweed has grown to a pre-determined size based on said weight.

11. The method of claim 1, wherein the harvesting unit is configured to untwist the section of the substrate loop.

12. The method of claim 1, wherein the seaweed is sea kelp, and the seaweed spores comprise one or more of meiospores, gametophytes, and juvenile sporophytes.

13. A system comprising:
a substrate loop;
a pulley on which the substrate loop is arranged and configured to move the substrate loop;
a seeding unit configured to inoculate the substrate loop with seaweed spores;
a harvesting unit configured to separate seaweed from the substrate loop;
a cleaning unit configured to free the substrate loop from seaweed; and one or more computers and one or more storage devices storing instructions that are operable, when executed by the one or more computers, to cause the one or more computers to perform operations comprising:
determining that seaweed has grown to a pre-determined size; and
based on the determination that the seaweed has grown to a pre-determined size:
providing instructions to the pulley to feed a section of the substrate loop to the harvesting unit;
providing instructions to the harvesting unit to separate the seaweed attached to the section of the substrate loop;
providing instructions to the cleaning unit to clean the section of the substrate loop that is freed from seaweed; and
providing instructions to the seeding unit to inoculate the cleaned section of substrate loop with seaweed spores.

14. The system of claim 13, wherein the seeding unit is configured to apply a solution comprising seaweed spores and a binding agent to the substrate loop.

15. The system of claim 13, wherein the seeding unit is configured to seal a portion of the substrate loop with water soluble film.

16. The system of claim 13, further comprising a suspension frame configured to vary the submersion depth of the substrate loop.

17. The system of claim 13, further comprising a camera trained on the seaweed, wherein the operations comprise determining that the seaweed has grown to a pre-determined size based on image data obtained from the camera.

18. The system of claim 13, wherein the harvesting unit is configured to untwist the section of the substrate loop.

19. The system of claim 13, wherein the substrate loop is one of a plurality of substrate loops, wherein the operations comprise providing instructions to the harvesting unit and the seeding unit to process different substrate loops.

20. A computer-readable storage device encoded with a computer program, the program comprising instructions that when executed by one or more computers cause the one or more computers to perform operations comprising:
determining that seaweed has grown to a pre-determined size; and
based on the determination that the seaweed has grown to a pre-determined size:
providing instructions to a pulley to feed a section of a substrate loop to a harvesting unit;
providing instructions to the harvesting unit to separate the seaweed attached to the section of the substrate loop;
providing instructions to a cleaning unit to clean the section of the substrate loop that is freed from seaweed; and
providing instructions to a seeding unit to inoculate the cleaned section of substrate loop with seaweed spores.

* * * * *